US007653480B2

(12) United States Patent
Tsuge et al.

(10) Patent No.: US 7,653,480 B2
(45) Date of Patent: Jan. 26, 2010

(54) TRAFFIC INFORMATION PROVIDING SYSTEM

(75) Inventors: Masakuni Tsuge, Minato-ku (JP); Koichi Washimi, Osaka (JP); Hiroyuki Tsuda, Bunkyo-ku (JP); Hirofumi Ohta, Osaka (JP)

(73) Assignee: Honda Motor Co., Ltd., Tokyo (JP)

( * ) Notice: Subject to any disclaimer, the term of this patent is extended or adjusted under 35 U.S.C. 154(b) by 36 days.

(21) Appl. No.: 11/095,970

(22) Filed: Mar. 30, 2005

(65) Prior Publication Data

US 2005/0222750 A1 Oct. 6, 2005

(30) Foreign Application Priority Data

Mar. 30, 2004 (JP) ............................. 2004-100884

(51) Int. Cl.
*G06F 7/00* (2006.01)

(52) U.S. Cl. ....................... 701/117; 709/219; 709/216; 340/995.13

(58) Field of Classification Search ................. 701/212, 701/208, 200, 117, 211, 202, 209, 214, 201; 340/995.15, 995, 995.13, 995.1; 709/219, 709/216; *G06F 7/00*

See application file for complete search history.

(56) References Cited

U.S. PATENT DOCUMENTS 5,933,100 A 8/1999 Golding
6,909,398 B2 * 6/2005 Knockeart et al. ..... 342/357.14
6,922,629 B2 * 7/2005 Yoshikawa et al. .......... 701/117
6,973,384 B2 * 12/2005 Zhao et al. .................. 701/117
6,989,765 B2 * 1/2006 Gueziec ....................... 340/905
7,440,842 B1 * 10/2008 Vorona ........................ 701/117
2001/0047242 A1 * 11/2001 Ohta .......................... 701/210
2001/0049582 A1 * 12/2001 Sakashita .................... 701/211
2002/0022923 A1 * 2/2002 Hirabayashi et al. ........ 701/200
2002/0026278 A1 * 2/2002 Feldman et al. ............. 701/117
2002/0128766 A1 9/2002 Petzold et al.
2003/0046304 A1 * 3/2003 Peskin et al. ............. 707/104.1

(Continued)

FOREIGN PATENT DOCUMENTS

EP 1235195 A2 8/2002

(Continued)

OTHER PUBLICATIONS

Japanese Office Action for Application No. JP2004-100884, dated Sep. 5, 2006.

*Primary Examiner*—Tuan C To
(74) *Attorney, Agent, or Firm*—Lahive & Cockfield, LLP; Anthony A. Laurentano, Esq.

(57) ABSTRACT

A system for providing a vehicle with traffic information reflecting the real traffic condition in each traveling direction is provided, even if the vehicle travels in either branch direction in a branch point area including the branch point. A traffic information server collects information on the time required for traveling in the branch point area from an information providing vehicle and generates information on the time required for traveling in each traveling direction in the branch point area on the basis of the information. Upon receiving a request for providing the traffic information from a navigation system of a vehicle the traffic information server transmits the information on the time required for traveling in each traveling direction or the information on the time required for traveling on each route in the branch point area generated from the above information.

5 Claims, 3 Drawing Sheets

U.S. PATENT DOCUMENTS

| | | | | |
|---|---|---|---|---|
| 2003/0144792 | A1* | 7/2003 | Amano et al. | 701/207 |
| 2003/0216857 | A1* | 11/2003 | Feldman et al. | 701/117 |
| 2004/0049338 | A1* | 3/2004 | Beesley et al. | 701/202 |
| 2004/0233070 | A1* | 11/2004 | Finnern | 340/995.13 |
| 2004/0236498 | A1* | 11/2004 | Le et al. | 701/200 |
| 2005/0251325 | A1* | 11/2005 | Kudo et al. | 701/200 |
| 2005/0264472 | A1* | 12/2005 | Rast | 345/30 |

FOREIGN PATENT DOCUMENTS

| | | |
|---|---|---|
| JP | 09-318377 | 12/1997 |
| JP | 2001-148094 | 5/2001 |
| JP | 2001-167385 | 6/2001 |
| JP | 2002-131067 | 5/2002 |

* cited by examiner

TRAFFIC INFORMATION PROVIDING SYSTEM

BACKGROUND OF THE INVENTION

1. Field of the Invention

The present invention relates to a system for providing a car navigation system with traffic information, and more particularly to a traffic information providing system suitable for providing traffic information on an area around a branch point such as an intersection or a junction on an expressway.

2. Related Background Art

For the purpose of reducing traffic congestion, there is known a service offered by the vehicle information and communication system (VICS) center to a vehicle driver to provide VICS information (traffic congestion or other traffic information) via a car navigation system. Moreover, there has been suggested a method of collecting traffic information using the VICS or the like (for example, refer to Japanese Laid-Open Patent Publication (Kokai) Nos. 2001-167385 and 9-318377).

By means of the VICS information obtained through the car navigation system, a vehicle driver can recognize, for example, that traffic congestion has occurred on a route that the vehicle is to pass through or can assess the time for passing through the route (the time required for traveling). Thereby, the vehicle driver can take measures to cope with the situation by changing the traveling route to his or her destination. Besides, the car navigation system can calculate a recommended route permitting the driver to avoid traffic congestion or the like on the basis of geographical information retained in the car navigation system and the VICS information given thereto and then to suggest it to the driver.

Incidentally, in the VICS information, a single piece of traffic information (for example, information such that the required time for traveling from a certain point A to a point B is a certain minutes) is assigned to a single route from the point A to the point B.

Meanwhile, if route “a” through the certain point A branches off in a plurality of routes “b” and “c” via a branch point X as shown in FIG. 2, the time required for traveling of the vehicle may depend upon whether the vehicle goes from the route a into the route b or into the route c. For example, in the shown example, the traffic lane of the route a toward the route b is in the traffic congestion, while the lane of the route a toward the route c is in a condition where vehicles are going smoothly. In this situation, the time required for the vehicle to go from the route a into the route b is longer than the time required for the vehicle to go into the route c.

The time required for traveling of the vehicle included in the traffic information on the route a provided by the VICS, however, is set to one value for the route a such as the time required for traveling on one of the lanes of the route a or an average of the time required for traveling on the lanes. In other words, a single piece of traffic information is assigned to the route a independently of which route is selected by the vehicle out of the routes a, b, and c.

Therefore, if the traffic congestion degree depends upon the route that the vehicle goes into from the route a as stated above, a large error often occurs in the time required for traveling determined from the VICS information. Moreover, if there are routes from the route a through the route b and from the route a through the route c to reach the final destination of the vehicle, the driver cannot determine which route is appropriate from the VICS information of the route a. As a result, occasionally the vehicle driver has selected an inappropriate route or the car navigation system has recommended an inappropriate route.

SUMMARY OF THE INVENTION

The present invention has been provided in view of this background. Therefore, it is an object of the present invention to provide a traffic information providing system capable of providing a vehicle with traffic information reflecting the real traffic condition in each of traveling directions even if the vehicle travels into any branch direction in a branch point (surrounding) area including the branch point. It is another object of the present invention to provide a traffic information providing system capable of providing the traffic information in a versatile format without exclusively using the traffic information.

In order to accomplish the foregoing objects, the present invention provides a traffic information providing system for providing an information-provided vehicle equipped with a navigation system with traffic information on at least a traveling route between a current or start position of the information-provided vehicle and a destination position thereof by means of communications with the navigation system, the traffic information providing system comprising: branch point area information collection means for collecting information transmitted from a plurality of information providing vehicles capable of transmitting information indicating at least a current position of each of their own vehicles by using the information providing vehicles when, in a branch point area composed of a given pre-branch route and a plurality of post-branch routes branching off from the pre-branch route at a given branch point, the information providing vehicles pass through the pre-branch route and one of the post-branch routes sequentially; required traveling time information generation means for generating information on a time required for traveling for use in identifying the time required for traveling when the vehicle travels from a given point in the pre-branch route through the branch point to a given point on each of the post-branch routes in each of traveling directions of the vehicle determined by each combination of the pre-branch route and each of the post-branch routes on the basis of the information collected by the branch point area information collection means; and traffic information transmission means for transmitting at least one of the information on the time required for traveling in each of the traveling directions generated by the required traveling time information generation means and the information for use in identifying the time required for traveling of the vehicle on the pre-branch route and each of the post-branch routes generated using the information on the time required for traveling to the navigation system of the information-provided vehicle, upon receiving a request for providing traffic information on a traveling route including the branch point area between the current or start position of the information-provided vehicle and the destination position thereof from the navigation system.

According to the present invention, the information (information showing at least the current position of the own vehicle) transmitted from the plurality of information providing vehicles is collected when the information providing vehicles travels in the branch point area, thereby enabling a generation of the information on the time required for traveling (for example, the time required for traveling itself and an average traveling speed) for use in identifying the time required for traveling of a vehicle from a given point in the pre-branch route to a given point in the post-branch route in each of the traveling directions determined by each combination of the pre-branch route and each of the post-branch routes in the branch point area (the direction determined by which post-branch route is selected as one the vehicle goes into from the pre-branch route in the traveling direction downstream) on the basis of the collected information. Then, the traffic information transmission means transmits at least one of the generated information on the time required for traveling in each of the traveling directions and the information for use in identifying the time required for vehicle traveling on the pre-branch route and each of the post-branch routes in the branch point area, which is generated using the foregoing information to the navigation system of the information-provided vehicle.

Therefore, according to the present invention, even if the vehicle travels in any branch direction in the branch point area including the branch point, the vehicle can be provided with traffic information reflecting the real traffic condition in each traveling direction. Incidentally, the navigation system in the information-provided vehicle can recognize the time required for traveling in each of the traveling directions in the branch point area on the basis of the real circumstances. Therefore, it becomes possible to properly calculate or select a traveling route where the vehicle can avoid traffic congestion as far as possible until it reaches the destination position.

The invention preferably further comprises route calculation means for receiving information including the current or start position of the information-provided vehicle and the destination position thereof from the navigation system of the information-provided vehicle and for calculating at least one candidate for the traveling route from the current or start position of the information-provided vehicle to the destination position thereof by using at least the current or start position and the destination position that have been received, wherein, if the candidate for the traveling route calculated by the route calculation means includes the branch point area, the traffic information transmission means transmits at least one (hereinafter, occasionally referred to as the branch point area traffic information in the description of the present invention) of the information on the time required for traveling in each of the traveling directions generated by the required traveling time information generation means and the information for use in identifying the time required for traveling of the vehicle on the pre-branch route and each of the post-branch routes generated using the information on the time required for traveling to the navigation system.

With these features, the route calculation means calculates the candidate for the traveling route from the current or start position of the information-provided vehicle to the destination position thereof by using the current or start position of the information-provided vehicle and the destination position thereof, which is received from the navigation system of the information-provided vehicle. If the calculated candidate for the traveling route includes the branch point area, the branch point area traffic information is transmitted to the navigation system of the information-provided vehicle. Therefore, the information-provided vehicle can be provided with the branch point area traffic information in real time when the information-provided vehicle needs the branch point area traffic information without a need for previously inquiring into the information on the traveling route between the current or start position and the destination position (the information on whether or not the branch point area can exist in the traveling route) in the navigation system.

Moreover, in the present invention, preferably the required traveling time information generation means generates, for each of the traveling directions, a combination of a first time required for traveling from a given point in the pre-branch route to the branch point and a second time required for traveling from the branch point to a given point on the post-branch route corresponding to each of the traveling directions as information on the time required for traveling in each of the traveling directions. The traffic information transmission means preferably includes means for calculating the time required for traveling before the branch point as time required for traveling from the given point in the pre-branch route to the branch point, which is common to all the traveling directions, on the basis of the first time required for traveling in each of the traveling directions and/or on the basis of the traffic information related to at least the pre-branch route provided by a second traffic information providing system; means for calculating the time required for traveling after the branch point as the time required for traveling from the branch point to the given point on the post-branch route corresponding to the relevant traveling direction by subtracting the time required for traveling before the branch point from a total sum of the first time required for traveling and the second time required for traveling corresponding to the relevant traveling direction in each of the traveling directions; and means for transmitting the time required for traveling before the branch point and each time required for traveling after the branch point, which have been calculated, as information for use in identifying the time required for traveling of the vehicle on the pre-branch route and each of the post-branch routes to the navigation system of the information-provided vehicle.

According to the above, the time required for traveling before the branch point and the time required for traveling after the branch point are calculated in such a way as to obtain the total sum of the first time required for traveling and the second time required for traveling in each traveling direction in the branch point area that is equal to the total sum of the time required for traveling before the branch point and the time required for traveling after the branch point corresponding to the relevant traveling direction. In other words, for an arbitrary single traveling direction in the branch point area, the total sum of the time required for traveling before the branch point and the time required for traveling after the branch point corresponding to the relevant traveling direction is equal to the total time required for traveling from the pre-branch route to the post-branch route in the traveling direction (the first time required for traveling+the second time required for traveling). The time required for traveling before the branch point and the time required for traveling after the branch point provide a single value for the route corresponding to each (the pre-branch route and each post-branch route), and therefore it corresponds to the time required for traveling for each route in the VICS information. Therefore, it becomes possible to transmit the time required for traveling before the branch point and each time required for traveling after the branch point as data in the format equivalent to the VICS information to the navigation system of the information-provided vehicle. As a result, it is possible to provide the traffic information on the branch point area composed of the time required for traveling before the branch point and the time required for traveling after the branch point in a versatile format without exclusively using the traffic information. Moreover, the time required for traveling before the branch point and each time required for traveling after the branch point have already been calculated at that time as stated above. Therefore, the navigation system of the information-provided vehicle can recognize the total time required for traveling in each traveling direction in the branch point area from these time periods. Thereby, an appropriate recommended route can be calculated or selected.

While the time required for traveling before the branch point can be a value calculated based on the first time required for traveling in each of the traveling directions (for example, an average value of the first time required for traveling in the traveling directions), it can also be calculated on the basis of the traffic information related to at least the pre-branch route provided by the second traffic information providing system such as the VICS center (for example, the time required for traveling of the pre-branch route in the VICS information is directly determined as the time required for traveling before the branch point). Besides, the time required for traveling before the branch point can be determined on the basis of both of the first time required for traveling in each of the traveling directions and the traffic information provided by the second traffic information providing system such as the VICS center.

DETAILED DESCRIPTION OF THE PREFERRED EMBODIMENTS

Figure 1:
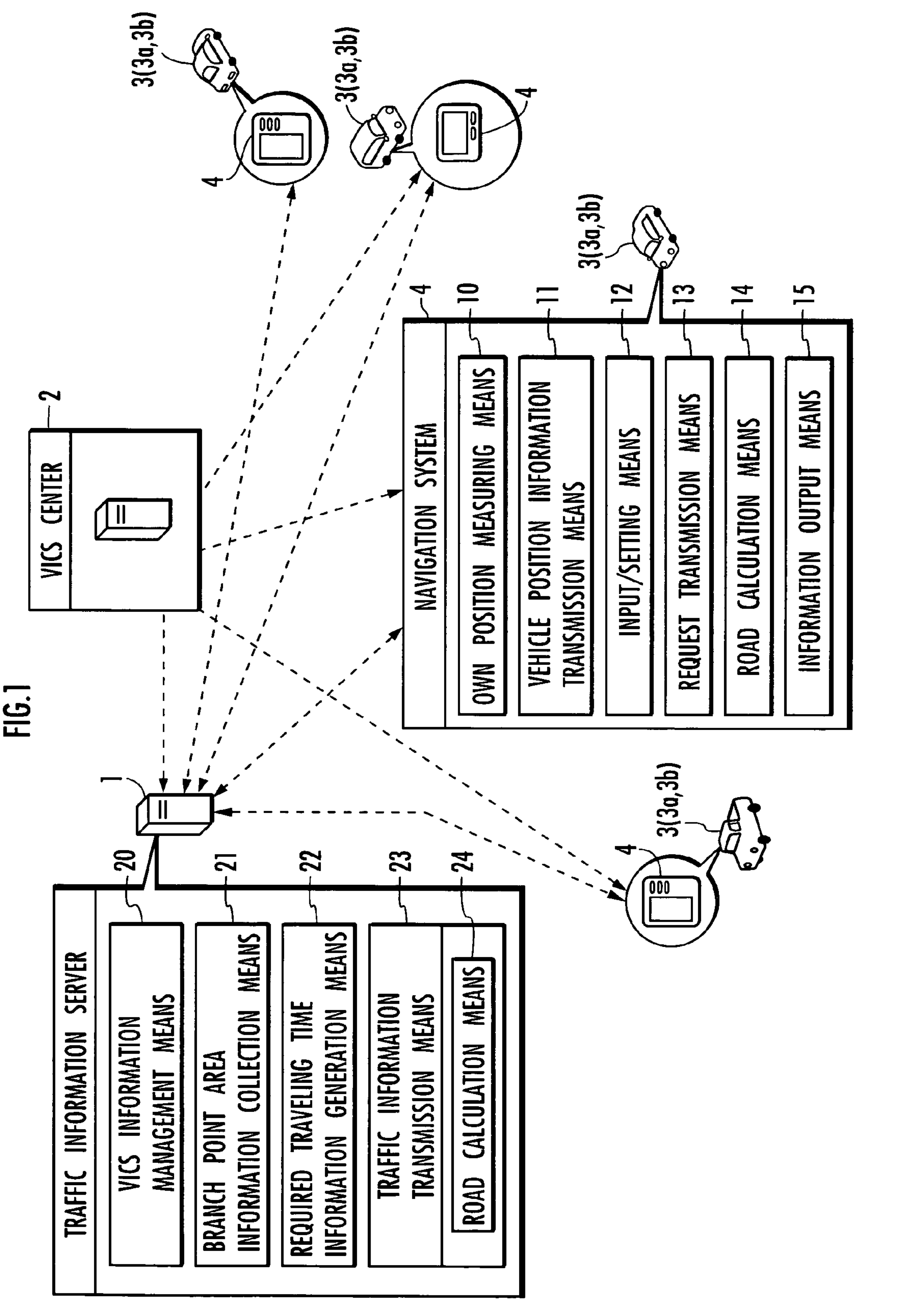
FIG. 1 is a diagram schematically showing an entire configuration of an embodiment of a system according to the present invention.

Referring to FIG. 1, there is shown a traffic information server 1 as a traffic information providing system according to the present invention. The traffic information server 1 can receive VICS information (traffic information) provided by a VICS center 2 (more specifically, a server of the VICS center 2) as the second traffic information providing system via communication equipment not shown. Moreover, it can communicate with a plurality of vehicles 3, 3,—each equipped with a navigation system 4 (so-called a car navigation system) via a communication means (not shown) having the navigation system 4. Moreover, the navigation system 4 can receive traffic information transmitted from the traffic information server 1 by means of the communication with the traffic information server 1 as described later and can receive VICS information provided by the VICS center 2 via a beacon or an FM broutecasting (an existing communication infrastructure related to the VICS) not shown.

Each vehicle 3 has a function of a vehicle for providing information to the traffic information server 1 as well as a function of a vehicle provided with information by the traffic information server 1 according to the navigation system 4 installed in the vehicle.

More specifically, the navigation system 4 of each vehicle 3 has an own position measuring means 10 for sequentially measuring the current position of its own vehicle in time series and a vehicle position information transmission means 11 for transmitting vehicle position information including the measured current position and the measured time (the current time) to the traffic information server 1. These own position measuring means 10 and the vehicle position information transmission means 11 cause the vehicle 3 equipped with the navigation system 4 to have the function of the information providing vehicle. The own position measuring means 10 measures the position of the own vehicle using an inertial navigation method in which an acceleration sensor or a gyro sensor is used, a GPS, or a known method in which they are combined.

The navigation system 4 comprises an input/setting means 12 for a driver of the vehicle 3 to input a start position (a starting place) or a destination position (a destination of traveling) of the driver's own vehicle or to set function of the navigation system 4, a request transmission means 13 for transmitting a request for providing traffic information to the traffic information server 1 at the time of setting or operation of a given function of the navigation system 4, a route calculation means 14 for calculating a recommended route from the input start position or the current position measured by the own position measuring means 10 to the destination position, and an information output means 15 for outputting all or a part of the calculated recommended route with geographical information to a display such as an LCD (not shown) or outputting various information on the recommended route by means of a voice.

In this regard, when transmitting the request for providing the traffic information to the traffic information server 1, the request transmission means 13 transmits information including the start position or the current position of the own vehicle and the destination position with the request for the provision to the traffic information server 1. The information to be transmitted can include traveling points or the like input by the driver between the start position or the current position and the destination position.

In the processing of calculating the recommended route, the route calculation means 14 uses the start position or the current position of the vehicle 3, the destination position, and geographical information obtained from an appropriate recording medium (a CD, a DVD, a hard disk, etc.) or the like provided in the navigation system 4, as well as the traffic information transmitted from the traffic information server 1 or the VICS information received from an existing communication infrastructure (a beacon or FM broutecasting) related to the VICS as described later according to a request transmitted by the request transmission means 13. The traffic information or the VICS information provided by the traffic information server 1 can be displayed by the information output means 15 or can be reported to the driver by means of a voice output, as well as being used for calculating the recommended route in the route calculation means 14. As stated above, by using the traffic information provided by the traffic information server 1 in the navigation system 4 of each vehicle 3, the vehicle 3 equipped with the navigation system 4 has the function of the information-provided vehicle in the present invention.

If there is a need for distinguishing the information-provided vehicle from the information providing vehicle regarding the vehicle 3 in the following description, a reference character 3*a* designates the former and a reference character 3*b* designates the latter.

While each vehicle 3 equipped with the navigation system 4 has both functions of the information-provided vehicle 3*a* and the information providing vehicle 3*b* in this embodiment, it is also possible to provide a dedicated information providing vehicle that has only a function of transmitting the vehicle position information including the current position and the current time (the time when the current position is measured) of the vehicle to the traffic information server 1. If so, the dedicated information providing vehicle only need be equipped with simply a device for transmitting the vehicle position information appropriately.

The traffic information server 1 has the main features: a VICS information management means 20 (the traffic information server 1 includes a module that performs the function of the VICS information management means 20) for acquiring and storing the VICS information from the VICS center 2;

a branch point area information collection means 21 (the traffic information server 1 includes a module that performs the function of the branch point area information collection means 21) for sequentially acquiring and collecting the vehicle position information (information including the current position and the current time) from each information providing vehicle 3*b* traveling on a route passing through a given branch point such as a predetermined specific intersection or junction of an expressway in an area including the branch point (a branch point area); a required traveling time information generation means 22 (the traffic information server 1 includes a module that performs the function of the required traveling time information generation means 22) for generating information on the time required for traveling in the branch point area on the basis of the information collected by the branch point area information collection means 21; and a traffic information transmission means 23 (the traffic information server 1 includes a module that performs the function of the traffic information transmission means 23) for appropriately generating traffic information such as a branch point area in response to a request (a request for providing the traffic information)from the information-provided vehicle 3*a* and transmitting it to the navigation system 4 of the information-provided vehicle 3*a*. The traffic information transmission means 23 includes a route calculation means 24 (the traffic information server 1 includes a module that performs the function of the route calculation means 24) for calculating a candidate for a traveling route of the information-provided vehicle 3*a* on the basis of the start position or the current position of the information provided vehicle 3*a* and the destination position transmitted with the request from the information-provided vehicle 3*a*.

Hereinafter, an operation of the traffic information server 1 will be specifically described together with processing of its respective means. In order to provide the information-provided vehicle 3*a* with traffic information, the traffic information server 1 previously acquires the VICS information by means of the VICS information management means 20 and previously collects information on the traffic of a branch point area including a given branch point from the information providing vehicle 3*b* by means of the branch point area information collection means 21. In this case, whenever VICS information provided by the VICS center 2 is updated, the VICS information management means 20 acquires the VICS information. The VICS information acquired by the VICS information management means 20 only need be within a coverage area where the traffic information server 1 provides traffic information.

Figure 2:
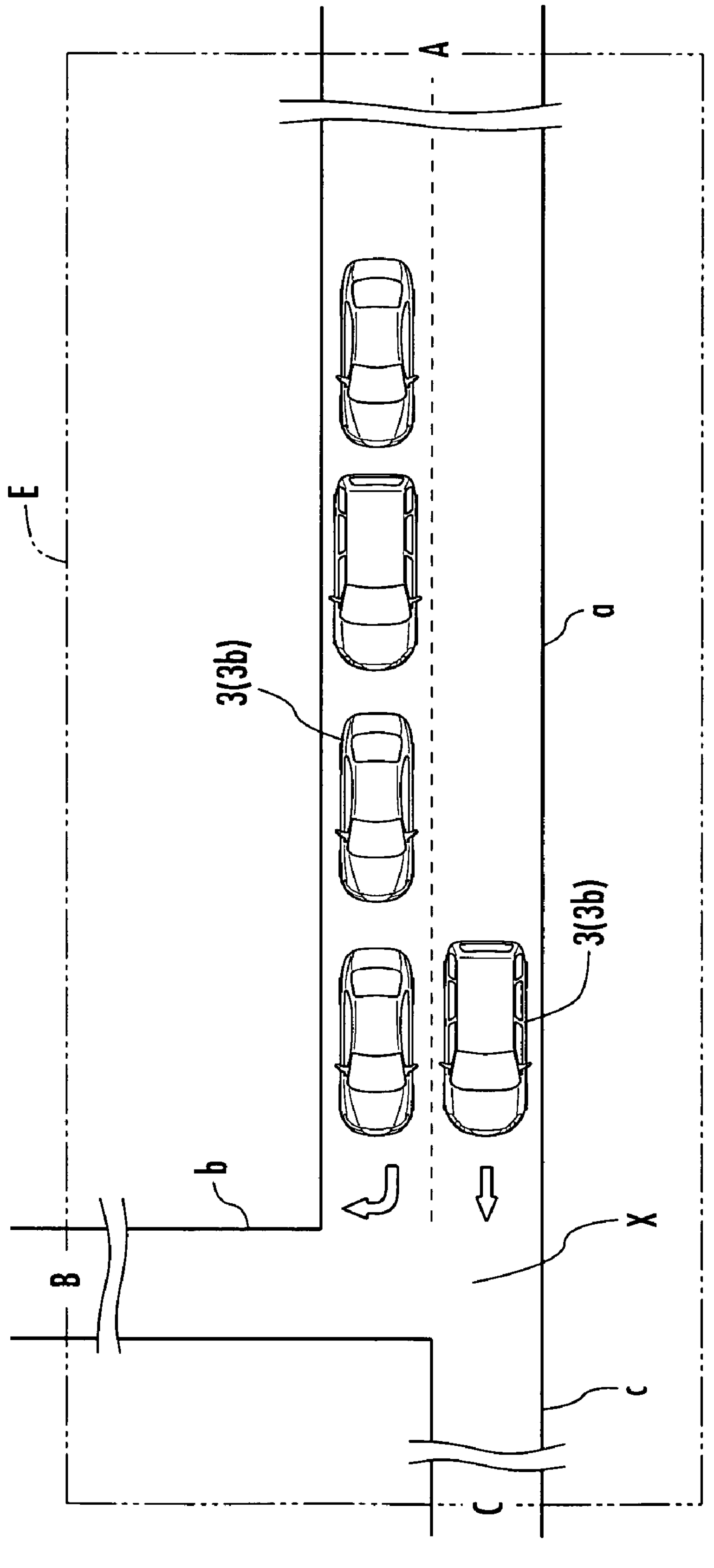
FIG. 2 is a diagram for explaining processing of the traffic information server shown in FIG. 1 and a branch point area.

In addition, the branch point area information collection means 21 acquires information on the branch point area as described below. For example, as shown in FIG. 2, it is assumed that a branch point area E including a predetermined branch point X is composed of a single pre-branch route a via a point A to the branch point X and two post-branch routes b and c, which branch off from the pre-branch route a at the branch point X and pass through a point B and a point C, respectively. Each of the points A, B, and C is a given distance away from the branch point X.

When one of the information providing vehicles 3*b* reaches the point A while traveling toward the branch point X on the pre-branch route a, the branch point area information collection means 21 stores vehicle position information including the current position and the current time (the time when the current position is measured) of the information providing vehicle 3*b* sequentially transmitted from a navigation system 4 thereof by means of the function of the vehicle position information transmission means 11 of the navigation system 4 of the information providing vehicle 3*b*. Thereafter, when the information providing vehicle 3*b* reaches the point B of the post-branch route b or the point C of the post-branch route c after passing through the branch point X, the branch point area information collection means 21 stops storing the vehicle position information. In this regard, it can be recognized from the vehicle position information sequentially transmitted from the navigation system 4 of the information providing vehicle 3*b* that the information providing vehicle 3*b* has reached the point A and the point B or C.

In this manner, the branch point area information collection means 21 acquires and stores the vehicle position information from the information providing vehicle 3*b* since the information providing vehicle 3*b* has reached the given point A on the single pre-branch route a toward the given branch point X until it reaches the given point B or C on the post-branch route b or c via the branch point X.

By acquiring the vehicle position information of the information providing vehicle 3*b,* the traffic information server can recognize the time required for traveling from the point A to the point B or C of the information providing vehicle 3*b,* the time required for traveling from the point A to the branch point X, and the time required for traveling from the branch point X to the point B or C from the vehicle position information. For example, the time required for traveling from the point A to the branch point X is represented by a difference between the current time in the vehicle position information when the information providing vehicle 3*b* reaches the point A and the current time in the vehicle position information when it reaches the branch point X.

In this condition, the traffic information server can recognize the time required for traveling in the vehicle traveling direction determined by a combination of the pre-branch route a and the post-branch route b (hereinafter, designated by a→b) from the vehicle position information of the information providing vehicle 3*b* that has gone into the post-branch route b from the pre-branch route a. It can recognize the time required for traveling in the vehicle traveling direction determined by a combination of the pre-branch route a and the post-branch route c (hereinafter, designated by a→c) from the vehicle position information of the information providing vehicle 3*b* that has gone into the post-branch route c from the pre-branch route a. In other words, it can recognize the time required for traveling in the branch point area E in each of the traveling directions a→b and a→c determined by the combination of the pre-branch route a and the post-branch route b or c.

The branch point area information collection means 21 associates the vehicle position information of each information providing vehicle 3*b* with the information providing vehicle 3*b* and the traveling direction a→b or a→c thereof and stores them. Moreover, the branch point area information collection means 21 discards the vehicle position information of the information providing vehicle 3*b* that has passed through the point B or C a given period of time before the current time.

More specifically, while the vehicle position information transmitted from the information providing vehicle 3*b* to the traffic information server 1 includes the current time information in this embodiment, the time information based on a clock of the traffic information server 1 can be used instead. Moreover, the vehicle position information can include vehicle speed information or the like of the information providing vehicle 3*b*.

The required traveling time information generation means 22 calculates the time required for traveling in each of the traveling directions a→b and a→c in the branch point area E on the basis of the vehicle position information collected from the information providing vehicle 3*b* by means of the branch point area information collection means 21 as stated above. More specifically, it calculates the first time required for traveling as the time required for traveling from the point A on the pre-branch route a to the branch point X and the second time required for traveling as the time required for traveling from the branch point X to the point B on the post-branch route b on the basis of the vehicle position information of the information providing vehicle 3*b* corresponding to the traveling direction a→b. In this case, if the vehicle position information corresponding to the traveling direction a→b is collected from a plurality of information providing vehicles 3*b*, the required traveling time information generation means 22 calculates, for example, an average in the first time required for traveling and an average in the second time required for traveling of the plurality of information providing vehicles 3*b*.

Similarly, it calculates the first time required for traveling, which is the time required for traveling from the point A on the pre-branch route a to the branch point X, and the second time required for traveling, which is the time required for traveling from the branch point X to the point C on the post-branch route c, on the basis of the vehicle position information of the information providing vehicle 3*b* corresponding to the traveling direction a→c.

The first time required for traveling in each of the traveling directions a→b and a→c is the time required for traveling from the point A of the pre-branch route a to the branch point X in either direction. The value, however, generally depends upon whether the traveling direction is a→b or a→c. For example, if there are more vehicles in the traveling direction a→b than those in the traveling direction a→c as illustrated in FIG. 2, the first time required for traveling in the traveling direction a→b is longer than that in the traveling direction a→c.

The required traveling time information generation means 22 calculates the first time required for traveling and the second time required for traveling in each traveling direction and updates the value at intervals of a given time period or whenever the vehicle position information from the information providing vehicle 3*b* reaches a certain amount. It then stores the calculated first time required for traveling and second time required for traveling.

More specifically, while the required traveling time information generation means 22 calculates the first time required for traveling and the second time required for traveling in each traveling direction in this embodiment, it is also possible to calculate, for example, an average traveling speed of the vehicle from the point A to the branch point X and an average traveling speed of the vehicle from the branch point X to the point B or C in each traveling direction. In this case, the distances from the branch point X to the point A, B, and C are predetermined, and therefore the time required for traveling in each traveling direction can be identified on the basis of the average traveling speed.

The processing of the branch point area information collection means 21 and the required traveling time information generation means 22 stated hereinabove is preparatory processing for providing traffic information in response to a request from the information-provided vehicle 3*a*.

The following describes an operation upon transmission of a request from the information-provided vehicle 3*a* to the traffic information server 1 for providing traffic information.

When the information-provided vehicle 3*a* is provided with the traffic information by the traffic information server 1, the request transmission means 13 of the navigation system 4 of the information-provided vehicle 3*a* transmits information including the start position or the current position and the destination position of the information-provided vehicle 3*a*, with the request for providing the traffic information, to the traffic information server 1 by means of a given operation or function setting of the navigation system 4.

The traffic information server 1 that has received the request for providing the traffic information then performs the processing of the traffic information transmission means 23. Specifically, the traffic information transmission means 23 calculates one or more candidates for the traveling route of the information-provided vehicle 3*a* from the start position or the current position to the destination position on the basis of the information including the start position or the current position and the destination position received from the information-provided vehicle 3*a* and the geographical information previously retained in the traffic information server 1, first.

Figure 3:
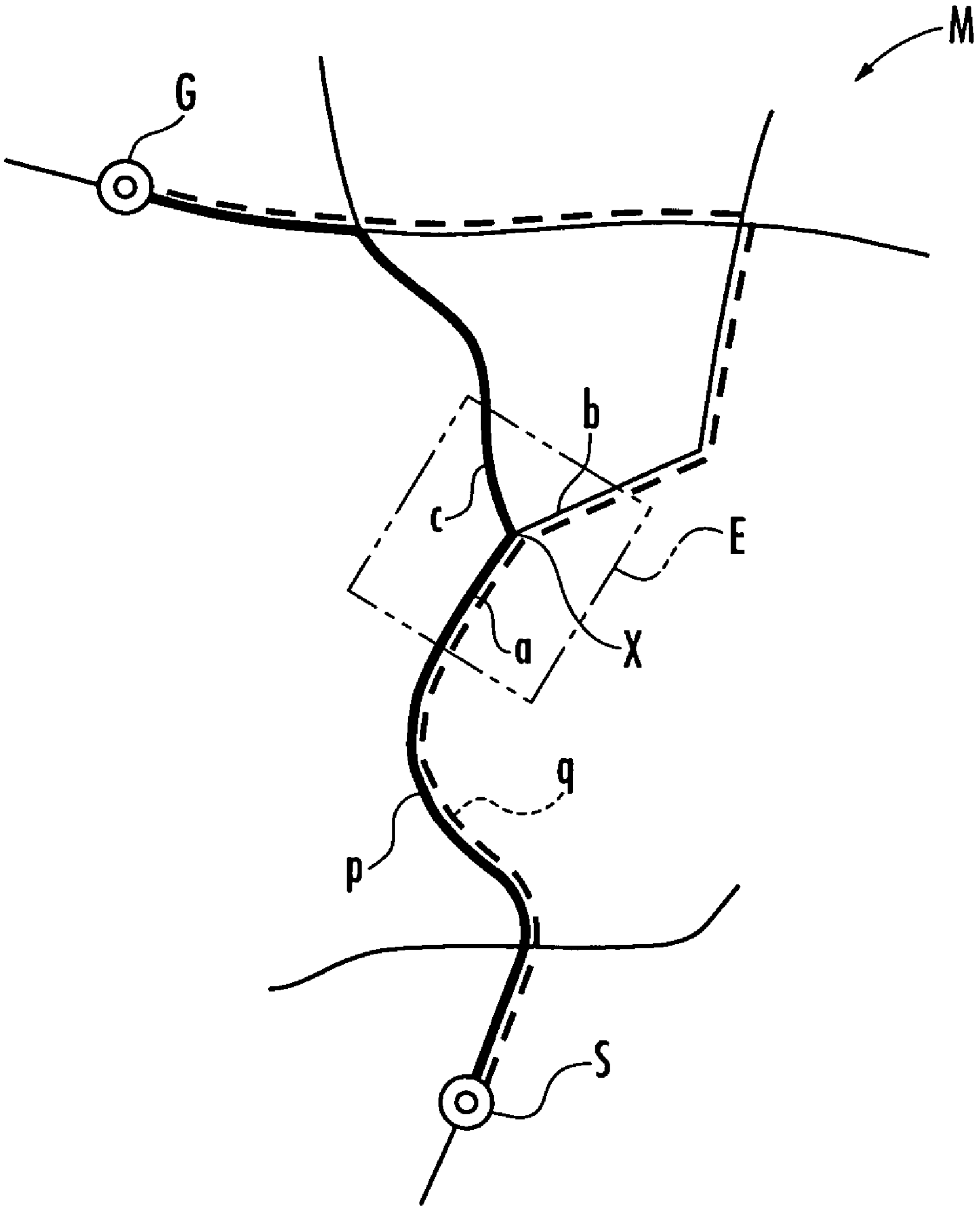
FIG. 3 is a diagram for explaining processing of the traffic information server shown in FIG. 1.

For example, assuming that a point S is the start position or the current position of the information-provided vehicle 3*a* and a point G is the destination position on map M as illustrated in FIG. 3, a route p indicated by a heavy solid line and a route q indicated by a heavy dashed line are calculated as candidates for the traveling route. If the information transmitted with the request by the information-provided vehicle 3*a* includes traveling points, candidates for the traveling route are calculated in such a way as to pass through the traveling points.

Subsequently, the traffic information transmission means 23 determines whether or not these candidates for the traveling route p and q include a given branch point such as the branch point X in the branch point area E. In the example described hereinafter, the candidates for the traveling route p and q are assumed to include the branch point X in the branch point area E (the candidates for the traveling route p and q pass through the branch point area E) as shown in FIG. 3.

If the candidates for the traveling route p and q (more accurately, at least one of the candidates for the traveling route) include the given branch point X as stated above, the traffic information transmission means 23 generates traffic information in the branch point area E in the following procedures (1) and (2):

(1) Calculates the time required for traveling before the branch point as the single time required for traveling from the point A on the pre-branch route a to the branch point X (the time required for traveling common to all traveling directions) independent of whether the vehicle traveling direction is a→b or a→c in the branch point area E on the basis of the first time required for traveling in each of the traveling directions a→b and a→c currently stored in the required traveling time information generation means 22.

Specifically, the traffic information transmission means 23 calculates an average of the first time required for traveling in all the traveling directions a→b and a→c (an average of the first time required for traveling in the traveling direction a→b and the first time required for traveling in the traveling direction a→c) currently stored in the required traveling time information generation means 22, as the time required for traveling before the branch point. If the branch point area E is a target area for providing the VICS information, the time required for traveling from the point A on the pre-branch route a to the branch point X recognized from the VICS information can be calculated as the time required for traveling before the branch point. Alternatively, the time required for traveling before the branch point can be calculated from the time required for traveling in the VICS information and the first time required for traveling in each traveling direction.

(2) Calculates the time required for traveling after the branch point as the time required for traveling from the branch point X to the point B or the point C on the post-branch route b or c in each traveling direction, from the total time of the first time required for traveling and the second time required for traveling in each of the traveling directions a→b and a→c currently stored in the required traveling time information generation means 22 and the time required for traveling before the branch point determined in the above procedure (1).

Specifically, the time required for traveling after the branch point corresponding to the traveling direction a→b is determined by subtracting the time required for traveling before the branch point from the total time of the first time required for traveling and the second time required for traveling in the traveling direction a→b currently stored in the required traveling time information generation means 22. Similarly, the time required for traveling after the branch point corresponding to the traveling direction a→c is determined by subtracting the time required for traveling before the branch point from the total time of the first time required for traveling and the second time required for traveling in the traveling direction a→c currently stored in the required traveling time information generation means 22.

In this embodiment, the time required for traveling before the branch point and the time required for traveling after the branch point in each traveling direction calculated in this manner are generated as traffic information on the branch point area E.

Table 1 shows the time required for traveling before the branch point and the time required for traveling after the branch point calculated as stated above and examples of their values as follows.

TABLE 1

| Traveling direction | First time required for traveling | Second time required for traveling | Time required for traveling before branch point | Time required for traveling after branch point |
|---|---|---|---|---|
| a → b | 15 min. | 10 min. | 11 min. | 14 min. |
| a → c | 7 min. | 8 min. | | 4 min. |

In the example shown in Table 1, the time required for traveling before the branch point is an average of the first time required for traveling in the traveling direction a→b (15 minutes) and the first time required for traveling in the traveling direction a→c (7 minutes). The time required for traveling after the branch point corresponding to the traveling direction a→b is the time (14 minutes) obtained by subtracting the time required for traveling before the branch point (11 minutes) from the total time (25 minutes) of the first time required for traveling (15 minutes) and the second time required for traveling (10 minutes) corresponding to the traveling direction a→b. Similarly, the time required for traveling after the branch point corresponding to the traveling direction a→c is determined to be 4 minutes (the first time required for traveling (7 minutes)+the second time required for traveling (8 minutes)−the time required for traveling before the branch point (11 minutes)).

When calculating the time required for traveling before the branch point and the time required for traveling after the branch point in each traveling direction as stated above, the total time of the time required for traveling before the branch point and the time required for traveling after the branch point in each traveling direction is equal to the total time of the first time required for traveling and the second time required for traveling in the corresponding traveling direction based on the vehicle position information collected from the information providing vehicle 3*b*. Therefore, the total time of the time required for traveling before the branch point and the time required for traveling after the branch point in each traveling direction reflects the actual time required for traveling in the corresponding traveling direction (the actual time required for traveling from the point A to the point B or the point C). Moreover, the time required for traveling before the branch point and the time required for traveling after the branch point in each traveling direction can be used to identify the total time of the first time required for traveling and the second time required for traveling in each traveling direction, namely, the actual time required for traveling from the point A on the pre-branch route a to the point B or the point C on the post-branch route b or c in each traveling direction.

The traffic information transmission means 23 generates the traffic information in the branch point area E (the time required for traveling before the branch point and the time required for traveling after the branch point in each traveling direction) as stated above. Thereafter, it generates the traffic information in an area other than the branch point area E related to the candidates for the traveling route calculated as described above. It then combines the above traffic information (including the traffic information in the branch point area E) and transmits it to the navigation system 4 of the information-provided vehicle 3*a*. In this case, regarding the traffic information on the area other than the branch point area E, for example, for a target area for providing the VICS information, the VICS information currently stored in the VICS information management means 20 is generated as the traffic information on the area. For an area other than the target area for providing the VICS information, the traffic information on the area is generated on the basis of the traffic information separately collected from the information providing vehicle 3*b* or the like. Note that, however, there is not always a need for generating traffic information on all areas of the candidates for the traveling route.

More specifically, the traffic information transmission means 23 converts the traffic information on the branch point area E and the traffic information on other areas to data in the format equivalent to the VICS information and transmits them to the navigation system 4 of the information-provided vehicle 3*a*. In this case, the traffic information on the branch point area E is composed of the individual periods of time required for traveling corresponding to the routes a, b, and c in the branch point area E. Therefore, the information can be converted to data in the format equivalent to the VICS information without any problem.

The above description has been made for a case where the candidates for the traveling route include the given branch point X. If, however, the candidates for the traveling route do not include a given branch point, the traffic information on the area related to the candidates for the traveling route is generated in the same manner as for the areas other than the branch point area E.

The traffic information transmitted from the traffic information server 1 as stated above is received by the navigation system 4 of the information providing vehicle 3*a*. Then, the navigation system 4 calculates a recommended route where the vehicle can reach the destination position in the shortest time on the basis of the start position or the current position of its own vehicle, the destination position, and the received traffic information by means of the route calculation means 14. In this case, the route calculation means 14 calculates the candidates for the traveling route from the start position or the current position to the destination position, for example, in the same manner as for the route calculation means 24 of the traffic information server 1 and selects a candidate for the traveling route where the vehicle can reach the destination position in the shortest time as a recommended route on the basis of the candidates for the traveling route and the received traffic information. Then, the recommended route determined by the route calculation means 14 in this manner is output to a liquid crystal display or the like with the geographical information via the information output means 15.

Regarding the time required for traveling before the branch point and the time required for traveling after the branch point in each traveling direction as the traffic information on the branch point area E, the total time of the time required for traveling before the branch point and the time required for traveling after the branch point in each traveling direction is equal to the total time of the first time required for traveling and the second time required for traveling in the relevant traveling direction based on the information from the information providing vehicle 3*b* as stated above.

Therefore, when determining the recommended route, the route calculation means 14 of the navigation system 4 can determine the recommended route that reflects the current traffic condition (the time required for traveling) in each traveling direction in the branch point area E. Therefore, it can determine an optimum recommended route for the vehicle to reach the destination position while avoiding traffic congestion.

Moreover, the traffic information provided to the information-provided vehicle 3*a* by the traffic information server 1 is converted to data in the format equivalent to the VICS information including the branch point area E, by which the navigation system 4 of the information-provided vehicle 3*a* can treat the traffic information on the branch point area E in the same manner as for the VICS information to calculate the recommended route. Therefore, there is no need to install a dedicated program or the like for treating the traffic information on the branch point area E into the navigation system 4, thereby permitting the prevention of an increase in cost of the navigation system 4 to adapt to the system of this embodiment.

In the embodiment described hereinabove, the time required for traveling before the branch point and the time required for traveling after the branch point in each traveling direction are calculated in order to adapt the format of the traffic information on the branch point area E provided by the traffic information server 1 to the VICS information. It is, however, not indispensable to the present invention. For example, it is also possible to transmit the first time required for traveling and the second time required for traveling in each traveling direction generated by the required traveling time information generation means 22 of the traffic information server 1 or the total time thereof as the traffic information in each traveling direction in the branch point area E to the navigation system 4 of the information-provided vehicle 3*a*. Alternatively, instead of the first time required for traveling and the second time required for traveling or the total time thereof, it is possible to use information that enables identifying them such as, for example, an average traveling speed from the point A to the branch point X and an average traveling speed from the branch point X to the point B or C in each traveling direction, or an average traveling speed from the point A to the point B or C in each traveling direction. If so, however, it should be noted that the traffic information on the branch point area E cannot be equivalent in the format to the VICS information and therefore the processing program for the navigation system 4 is liable to be complicated.

Furthermore, while the illustrated branch point area E includes two post-branch routes b and c in this embodiment, naturally it can include more post-branch routes. If so, as this embodiment, the traffic information server 1 can provide the information-provided vehicle 3*a* with traffic information on the branch point area.

Still further, while the VICS center 2 has been illustrated by an example as the second traffic information providing system in this embodiment, any other traffic information provided by a private company can be used instead of the VICS information.

What is claimed is:

1. A traffic information providing system for providing an information-provided vehicle equipped with a navigation system with traffic information on at least a traveling route between a current or start position of the information-provided vehicle and a destination position thereof by means of communications with the navigation system, the traffic information providing system comprising:

branch point area information collection means for receiving information transmitted from a plurality of information providing vehicles that pass through a branch point area branching for at least first and second traveling directions composed of a branch point, a pre-branch route having at least first and second traffic lanes and at least first and second post-branch routes continuing from the first and second traffic lanes, respectively, the information providing vehicles passing through the pre-branch route and one of the first and second post-branch routes sequentially and transmitting information on a current position of the vehicles;

required traveling time information generation means for calculating and updating information on a time required for the information providing vehicles to travel in the first traveling direction from a given point on the pre-branch route through the branch point to a given point on the first post-branch route and a time required for the information providing vehicles to travel in the second traveling direction from the given point on the pre-branch route through the branch point to a given point on the second post-branch route by processing the information collected by the branch point area information collection means; and traffic information transmission means for transmitting at least one of the information on the time required for traveling in each of the first and second traveling directions and the information used to determine the time required for traveling in each of the first and second traveling directions to the navigation system of the information-provided vehicle, upon receiving a request for providing traffic information on a traveling route including the branch point area between the current or start position of the information-provided vehicle and the destination position thereof from the navigation system, wherein the required traveling time information generation means generates, for each of the first and second traveling directions, a combination of a first time required for traveling from the given point on the pre-branch route to the branch point and a second time required for traveling from the branch point to the given point on the post-branch route corresponding to each of the first and second traveling directions as information on the time required for traveling in each of the first and second traveling directions, and wherein the traffic information transmission means includes:

means for calculating a third time required for traveling from the given point on the pre-branch route to the branch point by calculating an average time of all traveling directions for traveling from the given point on the pre-branch route to the branch point;

means for calculating a fourth time required for traveling from the branch point to the given point on the first post-branch route corresponding to the first traveling direction, wherein the fourth time is calculated by subtracting the third time required for traveling from the total time of the first time required for traveling and the second time required for traveling, and a fifth time required for traveling from the branch point to the given point on the second post-branch route corresponding to the second traveling direction, wherein the fifth time is calculated by subtracting the third time required for traveling from the total time of the first time required for traveling and the second time required for traveling; and means for transmitting the third, fourth and fifth times to the navigation system of the information-provided vehicle.

2. The traffic information providing system according to claim 1, further comprising route calculation means for receiving information including the current or start position of the information-provided vehicle and the destination position thereof from the navigation system of the information-provided vehicle and for calculating at least one candidate for the traveling route from the current or start position of the information-provided vehicle to the destination position thereof by using at least the current or start position and the destination position that have been received, wherein, if the candidate for the traveling route calculated by the route calculation means includes the branch point area, the traffic information transmission means transmits at least one of the information on the time required for traveling in each of the traveling directions generated by the required traveling time information generation means and the information for use in identifying the time required for traveling of the vehicle on the pre-branch route and each of the post-branch routes generated using the information on the time required for traveling to the navigation system.

3. The traffic information providing system according to claim 1, wherein the branch point area information collection means stores the information on the position of the information providing vehicles when the information providing vehicles reach the given point on the pre-branch route and stops storing the information on the current position of the information providing vehicles when the information providing vehicles reach the given point on the first post-branch route or the given point on the second post-branch route.

4. The traffic information providing system according to claim 1, wherein the branch point area information collection means discards the information on the position of the information providing vehicles that have passed the given point on the first post-branch route or the given point on the second post-branch route after a given period of time.

5. The traffic information providing system according to claim 1, wherein the required traveling time information generation means updates the information on the first time and the second time at intervals of a given time period.

* * * * *